(12) United States Patent
Lee et al.

(10) Patent No.: US 12,606,202 B2
(45) Date of Patent: Apr. 21, 2026

(54) APPARATUS AND METHOD OF AUTOMATICALLY DETECTING DYNAMIC OBJECT RECOGNITION ERRORS IN AUTONOMOUS VEHICLES

(71) Applicant: ELECTRONICS AND TELECOMMUNICATIONS RESEARCH INSTITUTE, Daejeon (KR)

(72) Inventors: Dong-Jin Lee, Daejeon (KR); Kyoung-Wook Min, Daejeon (KR); Jeong-Woo Lee, Daejeon (KR); Jeong Dan Choi, Daejeon (KR); Seung Jun Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 165 days.

(21) Appl. No.: 18/471,474

(22) Filed: Sep. 21, 2023

(65) Prior Publication Data

US 2024/0101149 A1 Mar. 28, 2024

(51) Int. Cl.
*B60W 60/00* (2020.01)

(52) U.S. Cl.
CPC ... *B60W 60/001* (2020.02); *B60W 2554/4049* (2020.02)

(58) Field of Classification Search
CPC ........ B60W 60/001; B60W 2554/4049; G06N 20/00; G06V 10/98; G06V 20/58
USPC .......................................................... 701/23
See application file for complete search history.

(56) References Cited

U.S. PATENT DOCUMENTS

| | | | | |
|---|---|---|---|---|
| 10,679,428 B1 * | 6/2020 | Chen | ..................... | G06V 10/764 |
| 10,699,169 B2 | 6/2020 | Kang et al. | | |
| 10,776,655 B1 * | 9/2020 | Newman | ................ | G06V 20/54 |
| 11,380,133 B2 | 7/2022 | Kim et al. | | |
| 12,060,083 B2 * | 8/2024 | Pendleton | ............. | B60W 30/09 |
| 12,216,737 B2 * | 2/2025 | Zhou | ..................... | G06F 18/217 |
| 12,374,073 B1 * | 7/2025 | Robinson | ............. | G06V 10/803 |
| 2009/0284589 A1 * | 11/2009 | Radeva | ................. | G06T 7/0012 |
| | | | | 382/128 |
| 2014/0201126 A1 * | 7/2014 | Zadeh | .................... | A61B 5/165 |
| | | | | 706/52 |
| 2018/0330171 A1 * | 11/2018 | Corcoran | ............... | G06V 20/58 |
| 2019/0370551 A1 * | 12/2019 | Mao | ....................... | G06V 20/52 |
| 2019/0383705 A1 * | 12/2019 | Smart | ...................... | G01H 1/00 |

(Continued)

FOREIGN PATENT DOCUMENTS

KR 10-2382219 B1 4/2022

*Primary Examiner* — Vivek D Koppikar
*Assistant Examiner* — Dominick Mulder
(74) *Attorney, Agent, or Firm* — Rabin & Berdo, P.C.

(57) ABSTRACT

A method of automatically detecting a dynamic object recognition error in an autonomous vehicle is provided. The method includes parsing sensor data obtained by frame units from a sensor device equipped in an autonomous vehicle to generate raw data by using a parser, analyzing the raw data to output a dynamic object detection result by using a dynamic object recognition model, determining that detection of a dynamic object recognition error succeeds by using an error detector when the dynamic object detection result satisfies an error detection condition, and storing the raw data and the dynamic object detection result by using a non-volatile memory when the detection of the dynamic object recognition error succeeds.

14 Claims, 5 Drawing Sheets

(56) References Cited

U.S. PATENT DOCUMENTS

| | | | |
|---|---|---|---|
| 2020/0027237 A1* | 1/2020 | Baumgartner | G06T 7/73 |
| 2020/0184278 A1* | 6/2020 | Zadeh | G06N 3/044 |
| 2021/0380278 A1* | 12/2021 | Gupta | B64D 9/00 |
| 2021/0390860 A1* | 12/2021 | Kang | G01S 7/539 |
| 2022/0012588 A1* | 1/2022 | Rhee | G06N 3/04 |
| 2022/0164609 A1 | 5/2022 | Lee et al. | |
| 2022/0172007 A1* | 6/2022 | Shang | G06N 20/00 |
| 2022/0187819 A1* | 6/2022 | Shalaby | G06F 18/214 |
| 2022/0367040 A1* | 11/2022 | Sutherland | G16H 40/67 |
| 2024/0020968 A1* | 1/2024 | Haskin | G06F 16/29 |
| 2024/0054394 A1* | 2/2024 | Hussain | G06N 3/0475 |
| 2024/0078452 A1* | 3/2024 | Ghourabi | G06N 3/096 |
| 2024/0293077 A1* | 9/2024 | Kumar | A61B 5/7267 |
| 2024/0351592 A1* | 10/2024 | Sadeghi | B60W 50/00 |

* cited by examiner

APPARATUS AND METHOD OF AUTOMATICALLY DETECTING DYNAMIC OBJECT RECOGNITION ERRORS IN AUTONOMOUS VEHICLES

CROSS-REFERENCE TO RELATED APPLICATIONS

This application claims the benefit of the Korean Patent Application Nos. 10-2022-0123272 filed on Sep. 28, 2022, and 10-2023-0116882 filed on Sep. 4, 2023, which are hereby incorporated by reference as if fully set forth herein.

BACKGROUND

Field of the Invention

The present invention relates to an apparatus and method of automatically detecting dynamic object recognition errors in autonomous vehicles, and more particularly, to technology which analyzes an output value of a dynamic object recognition model equipped in an autonomous vehicle to automatically detect a recognition error and stores driving data at a time at which the recognition error is detected.

Discussion of the Related Art

Autonomous vehicles may recognize a peripheral dynamic object by using various kinds of sensors such as LiDAR, radars, and cameras and may reflect information associated with the recognized dynamic object to generate a driving path in real time, and thus, may perform safe autonomous driving.

Recently, as deep learning technology and arithmetic devices advance rapidly, dynamic object recognition models based on the deep learning technology have been introduced into autonomous vehicles, and a collected data set has been disclosed in various driving environments.

Furthermore, research on various dynamic object recognition models has been performed by using a data set disclosed in a test environment, and when a dynamic object recognition model learns imbalance data included in the disclosed data set (for example, data associated with a specific object where the number of objects is less than the number of other objects), there is a high possibility that a detection error of the specific object occurs.

Therefore, data associated with the specific object having a high possibility that a detection error occurs in a test environment is selectively detected and stored, and then, when the dynamic object recognition model is trained by using learning data which is augmented to include the stored data, detection performance on the specific object may be enhanced. However, research is still insufficient on technology which selectively detects and stores the data associated with the specific object having a high possibility that the detection error occurs in the test environment.

SUMMARY

An aspect of the present invention is directed to providing an apparatus and method of automatically detecting and storing data causing a dynamic object recognition error in autonomous vehicles.

To achieve these and other advantages and in accordance with the purpose of the invention, as embodied and broadly described herein, there is provided a method of automatically detecting a dynamic object recognition error in an autonomous vehicle, the method including: parsing sensor data obtained by frame units from a sensor device equipped in an autonomous vehicle to generate raw data by using a parser; analyzing the raw data to output a dynamic object detection result by using a dynamic object recognition model; when the dynamic object detection result satisfies an error detection condition, determining that detection of a dynamic object recognition error succeeds by using an error detector; and when the detection of the dynamic object recognition error succeeds, storing the raw data and the dynamic object detection result by using a non-volatile memory, wherein the error detection condition includes a condition for determining whether a ratio of at least one specific dynamic object to all dynamic objects, detected from the raw data and the dynamic object detection result in M (where M is a natural number of 2 or more) number of frames, is greater than or equal to a reference ratio.

In an embodiment, the reference ratio may be set based on a ratio of the at least one specific dynamic object to the all dynamic objects in a learning data set previously collected in various test driving environments.

In an embodiment, the M may be 10 to 30.

In an embodiment, the error detection condition may include a condition for determining whether a frame ratio of frames including the at least one specific dynamic object in the M (where M may be a natural number of 2 or more) frames is greater than or equal to a reference frame ratio (%) which is previously set.

In an embodiment, the reference frame ratio (%) may be 20%.

In an embodiment, the reference frame ratio (%) may be set based on a frame ratio of frames including the at least one specific dynamic object detected from a test dynamic object detection result obtained through the dynamic object recognition model in the M frames while the autonomous vehicle is actually driving in various test driving environments.

In an embodiment, the at least one specific dynamic object may be an object which is detected in a reference distance up to the at least one specific dynamic object from the autonomous vehicle.

In an embodiment, the reference distance may be 30 m.

In an embodiment, the error detection condition may further include a condition for determining whether a confidence score of the at least one specific dynamic object is less than or equal to a reference confidence score.

In an embodiment, the error detection condition may further include a condition for determining whether a frame ratio of frames including the at least one specific dynamic object, having a confidence score which is less than or equal to the reference confidence score in the M frames, is greater than or equal to a predetermined reference frame ratio (%).

In an embodiment, the reference frame ratio may be 50%.

In an embodiment, the determining that the detection of the dynamic object recognition error succeeds may further include selecting a dynamic object, having the number of objects which is less than or equal to a reference ratio to a dynamic object where the number of objects is largest, as the at least one specific dynamic object in a learning data set previously collected in various test environments.

In another aspect of the present invention, there is provided an apparatus for automatically detecting a dynamic object recognition error in an autonomous vehicle, the apparatus including: a processor; a sensor controlled by the processor to obtain sensor data by frame units; a parser executed by the processor to parse the sensor data to generate raw data; a dynamic object recognition model executed by the processor to analyze the raw data to output a dynamic object detection result; an error detector executed by the processor and configured to, when the dynamic object detection result satisfies an error detection condition, determine that detection of a dynamic object recognition error succeeds; and a non-volatile memory controlled by the processor and configured to, when the detection of the dynamic object recognition error succeeds, storing the raw data and the dynamic object detection result.

In an embodiment, the error detection condition may include a condition for determining whether a ratio of at least one specific dynamic object to all dynamic objects, detected from the raw data and the dynamic object detection result in M (where M is a natural number of 2 or more) number of frames, is greater than or equal to a reference ratio.

It is to be understood that both the foregoing general description and the following detailed description of the present invention are exemplary and explanatory and are intended to provide further explanation of the invention as claimed.

DETAILED DESCRIPTION OF THE INVENTION

Hereinafter, example embodiments of the invention will be described in detail with reference to the accompanying drawings. In describing the invention, to facilitate the entire understanding of the invention, like numbers refer to like elements throughout the description of the figures, and a repetitive description on the same element is not provided.

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
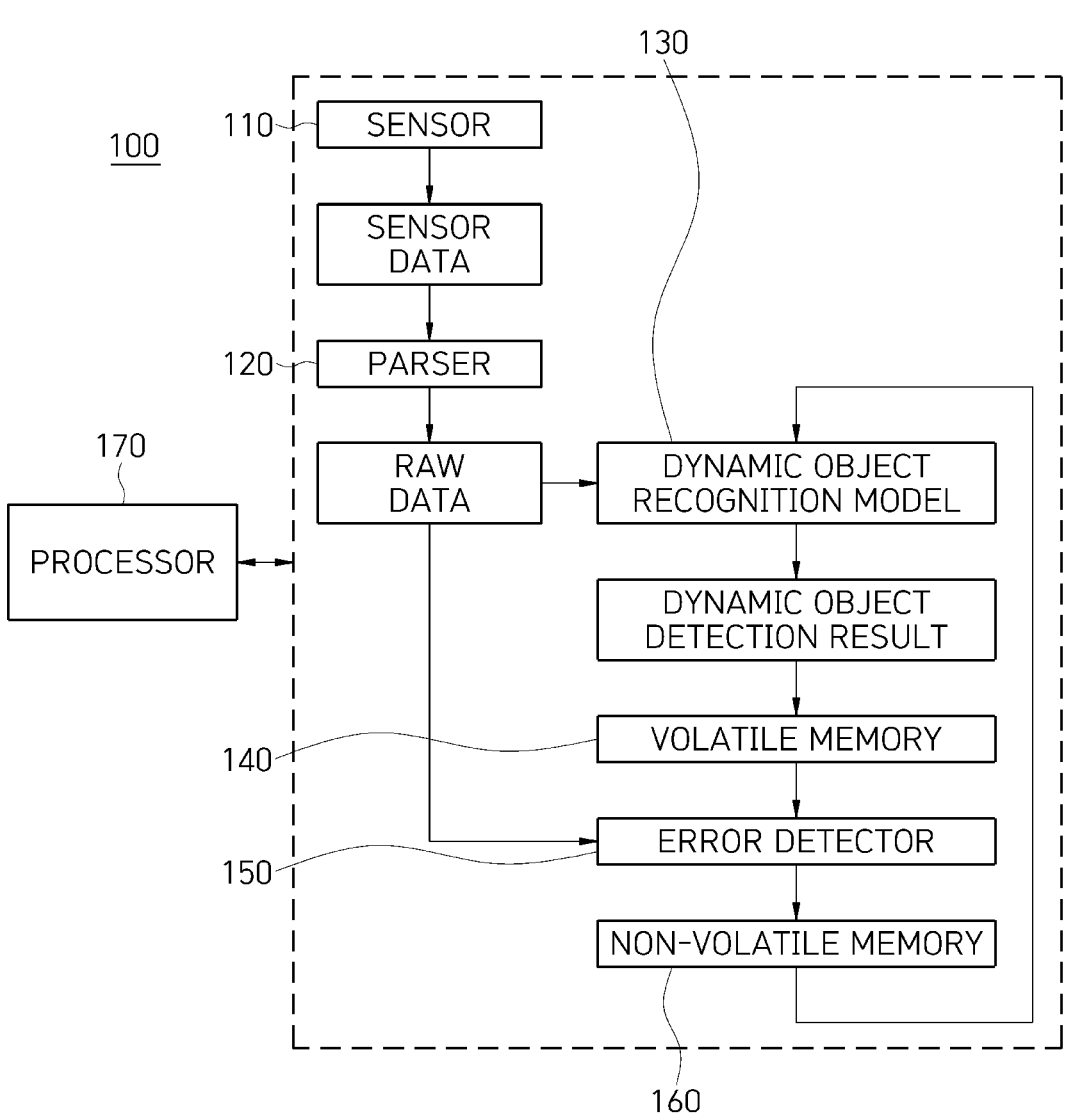
FIG. 1 is a schematic block diagram of an apparatus for automatically detecting a dynamic object recognition error in autonomous vehicles, according to an embodiment of the present invention.

FIG. 1 is a schematic block diagram of an apparatus 100 for automatically detecting a dynamic object recognition error in autonomous vehicles, according to an embodiment of the present invention.

Referring to FIG. 1, the apparatus 100 may be equipped in an autonomous vehicle. When the apparatus 100 detects data satisfying a predetermined error detection condition, the apparatus 100 may determine that a dynamic object recognition error is detected and may selectively store the data. Also, the apparatus 100 may use the selectively stored data as learning data, so as to enhance the performance of a dynamic object recognition model.

To this end, the apparatus 100 may include a sensor 110, a parser 120, a dynamic object recognition model 130, a volatile memory 140, an error detector 150, and a non-volatile memory 160, and moreover, may further include a processor 170 which controls and/or executes operations of the elements 110 to 160.

The sensor 110 may be controlled by the processor 170 and may sense dynamic objects located at a periphery of the autonomous vehicle to obtain sensor data by frame units. The sensor 110, for example, may include a LiDAR sensor, a radar sensor, a camera sensor, and a global positioning system (GPS) apparatus.

The parser 120 may be controlled by the processor 170 and may parse the sensor data to generate raw data. For example, the parser 120 may synchronize pieces of sensor data respectively obtained from the LiDAR sensor, the radar sensor, the camera sensor, and the GPS apparatus, based on time stamp information, and may generate the synchronized sensor data as raw data. Here, the synchronized sensor data may include point cloud data obtained by the LiDAR sensor, radar data obtained by the radar sensor, image data obtained by the camera sensor, GPS data obtained by the GPS apparatus, and calibration data thereof.

The dynamic object recognition model 130 may be executed by the processor 170 and may analyze the raw data to output dynamic object detection result data (hereinafter referred to as a dynamic object detection result). Here, the dynamic object recognition model 130 may be configured as a deep neural network.

The volatile memory 140 may function as a kind of frame buffer which temporarily stores the raw data and the dynamic object detection result. The raw data and the dynamic object detection result may be stored in the volatile memory 140 in a first-in-first-out (FIFO) queue scheme. The volatile memory 140 may store N pieces of data up to a current time T from a past time $T-(N-1)$, based on a FIFO scheme. For example, when N is 100, a data list stored in the volatile memory 140 may be as follows.

Point cloud data $(T-99 \sim T)$
Image data $(T-99 \sim T)$
Radar data $(T-99 \sim T)$
GPS data $(T-99 \sim T)$
Calibration data $(T-99 \sim T)$
Dynamic object detection result $(T-99 \sim T)$ The error detector 150 may be executed by the processor 170, and when the dynamic object detection result satisfies the predetermined error detection condition, the error detector 150 may determine that the detection of the dynamic object recognition error succeeds.

In an embodiment, the error detection condition may include a condition for determining whether a ratio of at least one specific dynamic object to all dynamic objects, detected from the dynamic object detection result in M (where M may be a natural number of 2 or more) number of frames, is greater than or equal to a reference ratio.

In an embodiment, the M may be 10 to 30, and for example, may be 10.

In an embodiment, the reference ratio may be 0.2, and in this case, when a ratio of the specific dynamic object to all dynamic objects detected from the dynamic object detection result is 0.2, the error detector 150 may determine that a dynamic object error occurs.

In an embodiment, the reference ratio may be set based on a ratio of the specific dynamic object to all dynamic objects in a learning data set which is previously collected and disclosed in various test driving environments.

In an embodiment, the at least one specific dynamic object may be selected based on the learning data set which is previously collected and disclosed in various test driving environments. In detail, dynamic objects having the number of objects which is less than or equal to the reference ratio (for example, 10%) to dynamic objects having the largest number of objects in the disclosed learning data set may be selected as the at least one specific dynamic object. For example, when the number of objects of vehicles is 117,315 and the number of objects of a cyclist is 4,198 in the learning data set which is previously collected and disclosed in various test driving environments, a ratio of the number of objects of cyclist to the number of objects of vehicles may be 3.5% which is less than 10%. Accordingly, the cyclist may be set as a specific dynamic object.

In an embodiment, the error detection condition may further include a condition for determining whether a frame ratio of frames including the at least one specific dynamic object in the M frames is greater than or equal to a predetermined reference frame ratio (%). Here, the reference frame ratio (%) may be 20%, and in this case, where a frame ratio of frames including the specific dynamic object detected from the dynamic object detection result in the M frames is 20%, it may be determined that the dynamic object error occurs.

In an embodiment, the reference frame ratio (%) may be set based on a frame ratio of frames including the at least one specific dynamic object detected from a test dynamic object detection result obtained through the dynamic object recognition model in the M frames while the autonomous vehicle is actually driving in various test driving environments.

In an embodiment, the at least one specific dynamic object may be an object which is detected in a reference distance up to the at least one specific dynamic object from the autonomous vehicle. Here, the reference distance may be, for example, about 30 m.

In an embodiment, the error detection condition may further include a condition for determining whether a confidence score of the at least one specific dynamic object is less than or equal to a reference confidence score.

In an embodiment, the error detection condition may further include a condition for determining whether a frame ratio of frames including the at least one specific dynamic object, having a confidence score which is less than or equal to the reference confidence score, is greater than or equal to a predetermined reference frame ratio (%). Here, the reference frame ratio may be about 50%.

The non-volatile memory 160 may be controlled by the processor 170, and when the detection of the dynamic object recognition error succeeds, the non-volatile memory 160 may store the raw data and the dynamic object detection result at a time at which the dynamic object recognition error is detected.

In an embodiment, the raw data and the dynamic object detection result may be stored in the non-volatile memory 160 as in the following Table 1.

TABLE 1

| No. | Folder or File Name | Number of Frames (N: number of sensors) | Storage File Format | Description |
|---|---|---|---|---|
| 1 | Camera(folder) | 200*N | JPG or PNG | Data of camera sensor |
| 2 | LiDAR(folder) | 200*N | PCD or BIN | Data of LiDAR sensor |
| 3 | Radar(folder) | 200*N | PCD or BIN | Data of radar sensor |
| 4 | Label(folder) | 200 | TXT | Dynamic object detection result |
| 5 | GPS(folder) | 200 | TXT | GPS data |
| 6 | Calibration(folder) | 200 | TXT | Calibration data |
| 7 | Error__code.txt | | TXT | Error detection condition |

PCD: Point Cloud Data file
BIN: Binary File
TXT: Text file

The raw data and the dynamic object detection result each stored in the non-volatile memory 160 may be labeled through an annotation operation, the labeled raw data and dynamic object detection result may be reconfigured as learning data, and the reconfigured learning data may be input to the dynamic object recognition model 130. The dynamic object recognition model 130 may learn the reconfigured learning data, and thus, detection performance on a dynamic object causing a dynamic object recognition error may be enhanced.

Furthermore, the processor 170 may be a device which controls and/or executes operations of the elements 110 to 160 and may be configured to include at least one central processing unit (CPU) and at least one graphics processing unit (GPU). The processor 170 may be, for example, a dedicated chip. Here, the dedicated chip may include a system on chip (SoC), a microcontroller unit (MCU), and a mobile application processor (AP).

Figure 2:
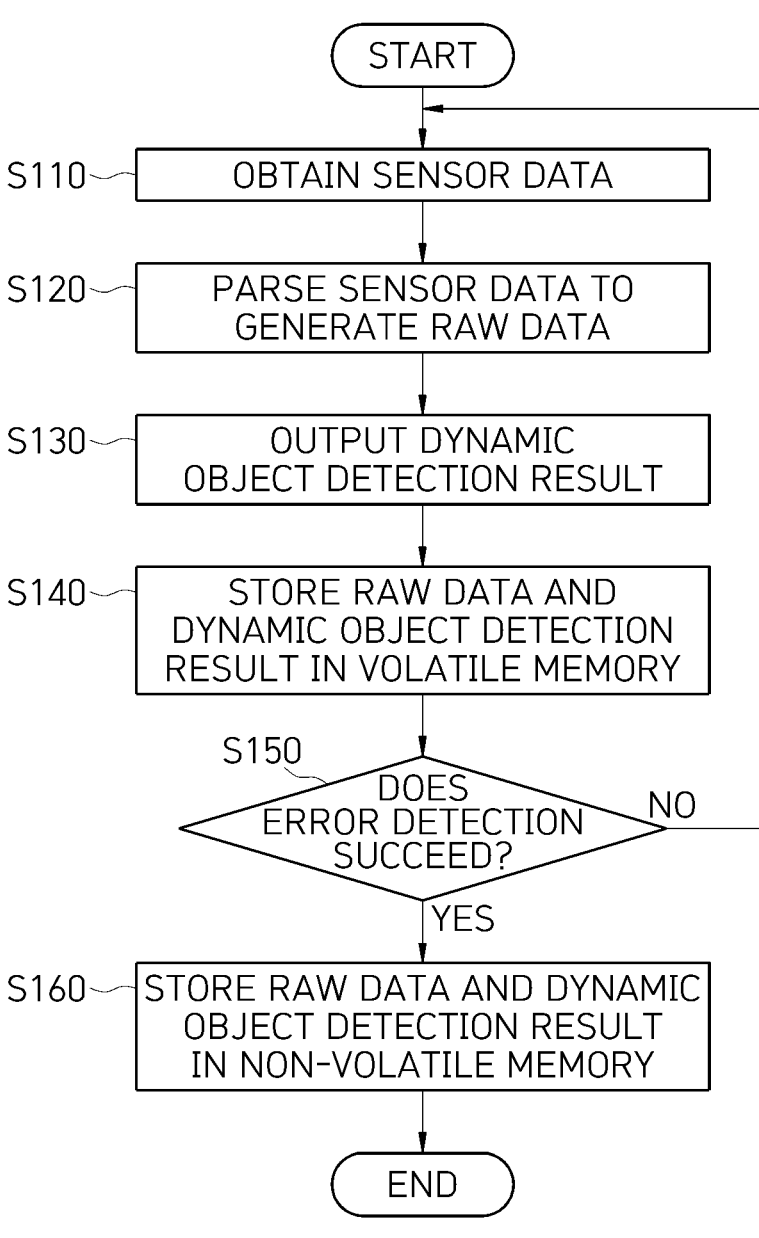
FIG. 2 is a flowchart for describing an operating method of the apparatus of FIG. 1.

FIG. 2 is a flowchart for describing an operating method of the apparatus of FIG. 1.

Referring to FIG. 2, first, in step S110, a process of obtaining sensor data by frame units by using the sensor 110 equipped in the autonomous vehicle may be performed.

Subsequently, in step S120, a process of parsing the sensor data to generate the raw data by using the parser 120 executed by the processor 170 may be performed.

Subsequently, in step S130, a process of analyzing the raw data to output a dynamic object detection result by using the dynamic object recognition model 130 executed by the processor 170 may be performed.

Subsequently, in step S140, a process of temporarily storing the raw data and the dynamic object detection result by using the volatile memory 140 controlled by the processor 170 may be performed.

Subsequently, in step S150, a process of, when the dynamic object detection result satisfies an error detection condition, determining that detection of a dynamic object recognition error succeeds by using the error detector 150 executed by the processor 170 may be performed. Here, the error detection condition may include a condition for determining whether a ratio of at least one specific dynamic object to all dynamic objects, detected from the dynamic object detection result in M (where M may be a natural number of 2 or more) number of frames, is greater than or equal to a reference ratio. A detailed description of the error detection condition may be replaced with the description described above. Furthermore, when the detection of the dynamic object recognition error fails, steps S110 to S140 may be repeatedly performed. Such a repetition process may be continuously performed until a dynamic object recognition error detection process on all frames is completed.

Subsequently, in step S160, a process of, when the detection of the dynamic object recognition error succeeds, storing the raw data and the dynamic object detection result by using the non-volatile memory 160 controlled by the processor 170 may be performed.

Hereinafter, a process of calculating an error condition for detecting the dynamic object recognition error will be described below in detail.

Figure 3:
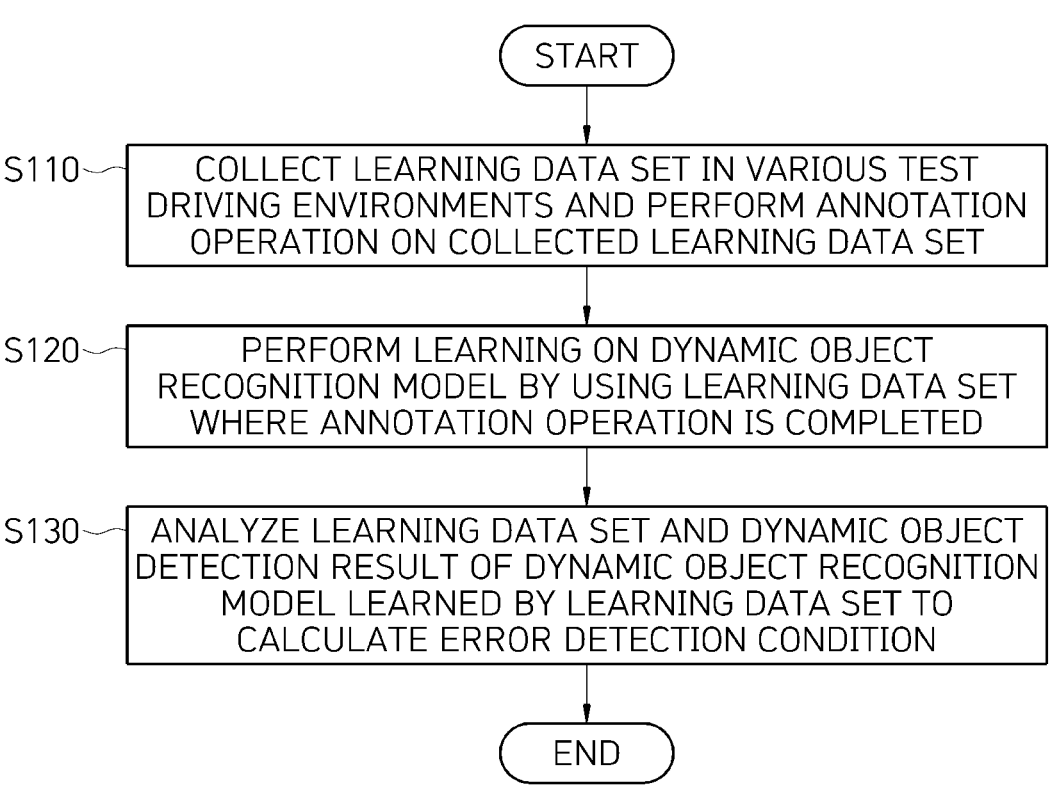
FIG. 3 is a flowchart for describing an operation of calculating an error condition for detecting the dynamic object recognition error, according to an embodiment of the present invention.
Figure 4:
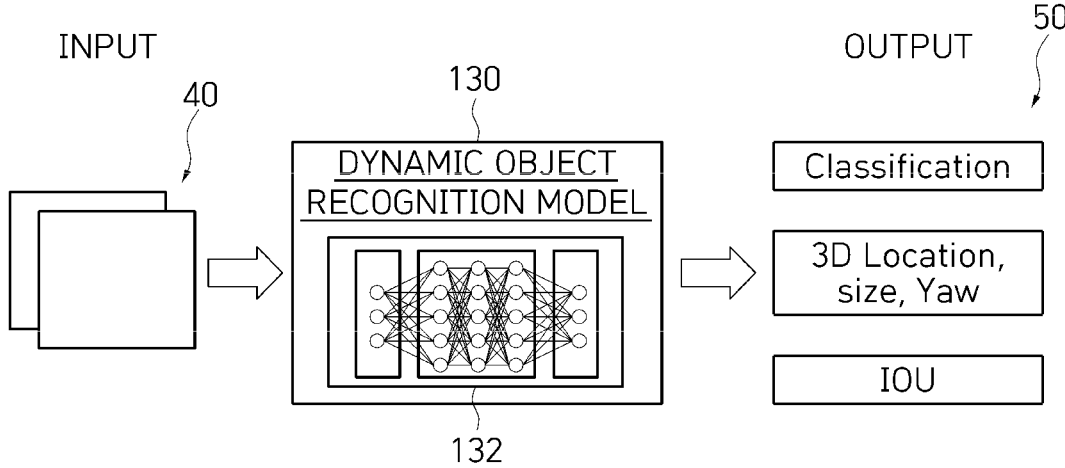
FIG. 4 is a diagram for describing a learning process S120 of FIG. 3.

FIG. 3 is a flowchart for describing an operation of calculating an error condition for detecting the dynamic object recognition error, according to an embodiment of the present invention. FIG. 4 is a diagram for describing a learning process S120 of FIG. 3.

First, referring to FIG. 3, in step S110, a process of collecting a learning data set in various test driving environments and performing an annotation operation on the collected learning data set may be performed.

The learning data set may be collected in various weathers and driving environments by using sensors including a LiDAR sensor, a radar sensor, a camera sensor, and a GPS apparatus each equipped in an autonomous vehicle. In this case, a synchronization process and a calibration process on pieces of sensor data collected by the sensors may be performed for dynamic object detection and data visualization based on multi-sensor fusion. Some sensor data of the collected pieces of sensor data may be selected, and an annotation operation of generating annotation data of the selected some sensor data may be performed. In this case, the annotation data may include a tracking identification (ID) and a class of a dynamic object and a location, a size, a direction of the dynamic object in a three-dimensional (3D) space. Such annotation data, for example, may be stored in a memory in a one-dimensional vector form where a size is 9.

Subsequently, in step S120, a process of performing learning on a dynamic object recognition model (or a dynamic object detection model) by using the learning data set where the annotation operation is completed may be performed. Such a learning process may be performed by a processor including at least one CPU and at least one GPU.

A learning process of the dynamic object recognition model 130, as illustrated in FIG. 4, may include an input process of a learning data set 40 on which the annotation operation is completed, an inference process of the dynamic object recognition model 130, and an output process of a dynamic object detection result 50.

In the input process, the learning data set 40 may include all pieces of sensor data on which an annotation operation used in dynamic object detection is completed. When the sensor data is LiDAR sensor data, the LiDAR sensor data may include N pieces of point cloud data, and each of the point cloud data may include a position value (X, Y, Z) of the dynamic object on the autonomous vehicle and intensity of a signal reflected by the dynamic object.

The dynamic object recognition model 130 may include a deep learning network 132 having various structures and may extract a feature, needed for detection of a dynamic object, from the learning data set which is input data.

The dynamic object recognition model 130 may output object classification, a 3D location of a 3D space, a 3D size, yaw, and intersection over union (IOU) between ground truth and a predicted 3D bounding box. That is, the dynamic object recognition model 130 may learn the output.

Moreover, the dynamic object recognition model 130 may calculate a confidence score (CS) of a dynamic object detected from a dynamic object detection result. The confidence score (CS) may be calculated as expressed in the following Equation 1.

$$CS = \text{Classification Probability} \times IOU \qquad \text{[Equation 1]}$$

The CS may represent a possibility that an object is in the predicted 3D bounding box. Accordingly, based on a setting of an appropriate CS threshold value, the false detection of a dynamic object in a test environment may be minimized.

Subsequently, in step S130, a process of analyzing the learning data set and a dynamic object detection result of a dynamic object recognition model learned by the learning data set to calculate the error detection condition may be performed.

The error detection condition may be generated based on the learning data set 40 and the dynamic object detection result which an inference result of the dynamic object recognition model 130. A dynamic object recognition error may be represented by the detection performance of the dynamic object recognition model. To evaluate the detection performance of a dynamic object, mean average precision (mAP) which is one of object detection evaluation indicators may be used.

Ground truth may be needed for calculating the mAP. However, a dynamic object may be detected in an autonomous vehicle in real time, and simultaneously, it may be impossible to generate ground truth. Accordingly, an error detection condition which enables a dynamic object recognition model equipped in an autonomous vehicle to automatically detect a dynamic object recognition error without ground truth may be needed.

Figure 5:
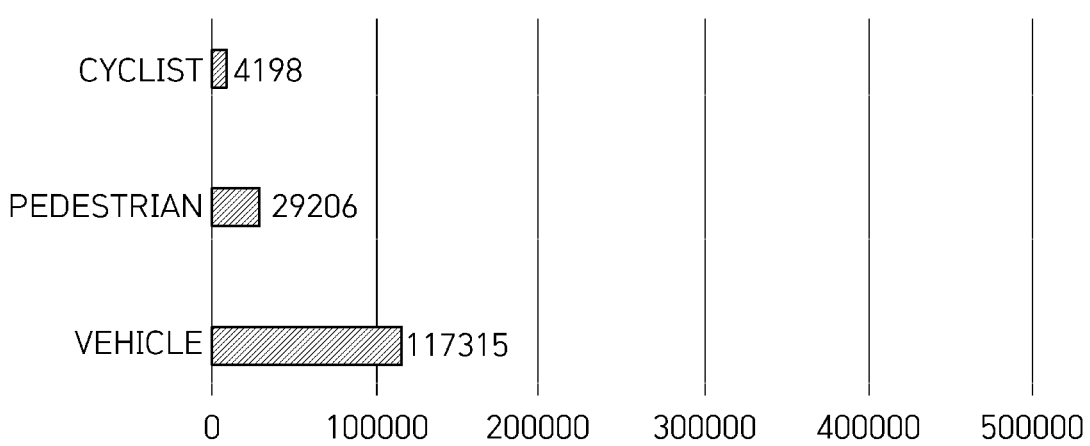
FIGS. 5 and 6 are diagrams for describing a calculation background of an error detection condition for automatically detecting a dynamic object recognition error, according to an embodiment of the present invention.
Figure 6:
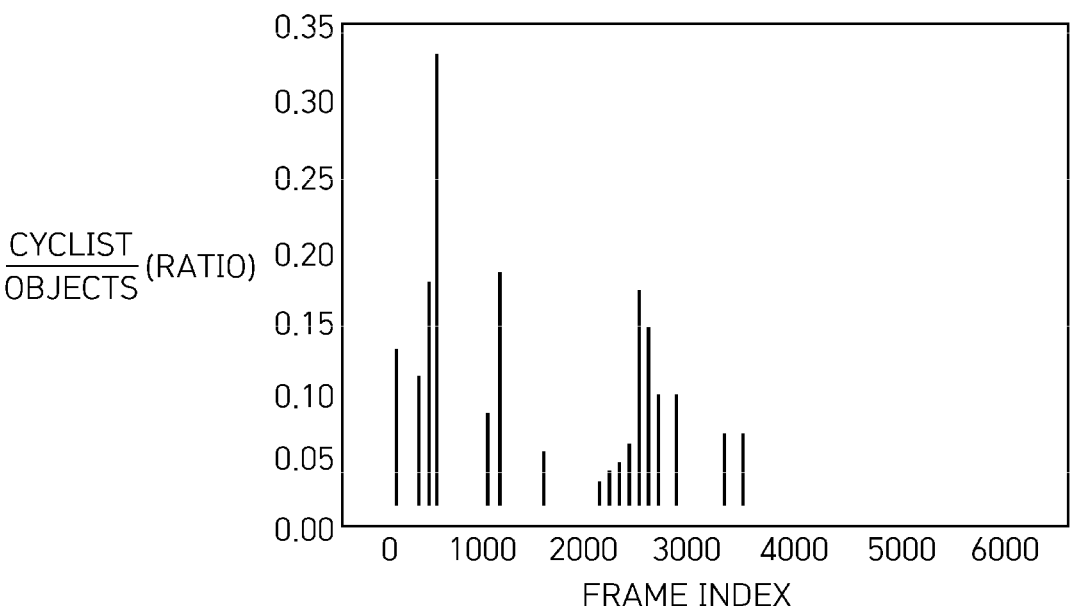

FIGS. 5 and 6 are diagrams for describing a calculation background of an error detection condition for automatically detecting a dynamic object recognition error, according to an embodiment of the present invention.

A case which uses the learning data set having an object distribution as illustrated in FIG. 5 may be assumed for learning of the dynamic object recognition model (130 of FIG. 4). The learning data set may consist of three classes including a vehicle, a pedestrian, and a cyclist. In the learning data set, the number of objects of a cyclist which is a specific dynamic object may be relatively less than the vehicle and the pedestrian. Accordingly, the learning data set may have a problem such as imbalance data.

In a case where the dynamic object recognition model learns based on a learning data set having the imbalance data, a class where the number of objects is small (i.e., detection performance on a cyclist) may be low. Therefore, it may be important to adjust a balance of all classes which are possible in a step of generating a learning data set. Accordingly, it may be needed to selectively store data including more cyclists than other dynamic objects.

To this end, as in FIG. 6, the error detection condition may be calculated by analyzing a ratio occupied by a cyclist among all dynamic objects in the learning data set. For example, as illustrated in FIG. 6, a case where a ratio occupied by the cyclist among all dynamic objects is 0.2 is few, and thus, an error detection condition where 0.2 is set to the reference ratio may be calculated. That is, when a ratio of at least one specific dynamic object to all dynamic objects is 0.2, data associated with the specific dynamic object may be detected as data causing the dynamic object recognition error. In this case, a condition of a frame ratio may be further provided. For example, when a ratio of frames occupied by a specific dynamic object having a ratio of 0.2 or more among M (where M may be a natural number of 2 or more) number of frames is greater than or equal to a reference frame ratio, data associated with the specific dynamic object may be detected as data causing the dynamic object recognition error. The present invention is not limited, but the M may be 10 to 30, and for example, may be 10. The M may be variously changed based on a test driving environment, a sensing range of a sensor, and the performance of a dynamic object recognition model. Also, the reference frame ratio may be, for example, 20%.

Figure 7:
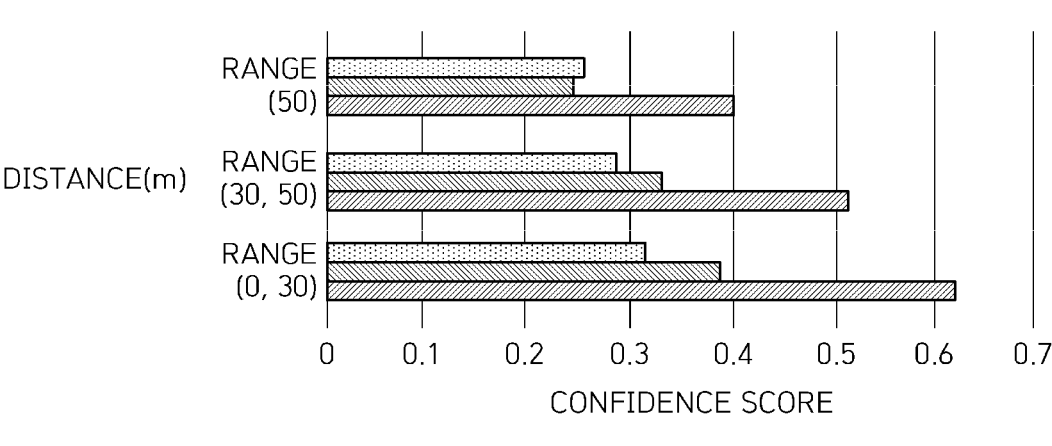
FIG. 7 is a diagram for describing a calculation background of an error detection condition for automatically detecting a dynamic object recognition error, according to another embodiment of the present invention.

FIG. 7 is a diagram for describing a calculation background of an error detection condition for automatically detecting a dynamic object recognition error, according to another embodiment of the present invention and is a graph showing a confidence score with respect to a distance and a class.

Referring to FIG. 7, an error detection condition according to another embodiment of the present invention may be calculated from a case where a dynamic object where the confidence score is low (close to a threshold value).

The confidence score, as described above, may represent a possibility that an object is in a 3D bounding box. For example, when a reference confidence score is set to 0.2 in an inference process of the dynamic object recognition model 130, all dynamic objects having a CS value of less than 0.2 may be filtered. Also, as a confidence score of a dynamic object is similar to 0.2, a possibility that the dynamic object is an abnormally detected object or is an object which is not included in the learning data set may be high.

Therefore, data associated with a corresponding dynamic object may be stored and the stored data may be labeled through an annotation process, and then, when the dynamic object recognition model 130 learns a learning data set including the labeled data, an object detection error may be minimized.

As illustrated in FIG. 7, as the number of objects of a specific class in a learning data set increases, a CS value of the specific class may be high, and thus, based on such a result, an error detection condition may be calculated.

To predict and avoid a collision risk in autonomous driving, an object located at a close distance may be more important than an object located at a long distance. Also, false positive and false negative may occur by frame units. Therefore, a condition for determining whether a frame ratio of frames, having a confidence score less than or equal to the reference confidence score and including a specific dynamic object having the confidence score among M (for example, 10) number of frames, is greater than or equal to a predetermined reference frame ratio (%) may be calculated as an error detection condition. Here, the reference frame ratio (%) may be, for example, 50%. The specific dynamic object may include all dynamic objects included in a learning data set. In this case, the reference confidence score may be differently set for each dynamic object. For example, a reference confidence score of a vehicle may be set to 0.2 to 0.3, a reference confidence score of a pedestrian may be set to 0.2 to 0.25, and a reference confidence score of a cyclist may be set to 0.2 to 0.25.

As described above, the present invention may selectively store dynamic object data satisfying the error detection condition (or data storage condition) described above and may label the stored dynamic object data through the annotation operation. Subsequently, the dynamic object recognition model 130 may learn a learning data set including the labeled dynamic object data, and thus, the detection performance of the dynamic object recognition model 130 may be enhanced.

According to the present invention, data causing a dynamic object recognition error in autonomous vehicles may be automatically detected and stored, and thus, time and cost needed for manually detecting and storing the data causing the dynamic object recognition error may be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of automatically detecting a dynamic object recognition error in an autonomous vehicle, the method comprising:

parsing sensor data obtained by frame units from a sensor device equipped in an autonomous vehicle to generate raw data by using a parser;

analyzing the raw data to output a dynamic object detection result by using a dynamic object recognition model;

when the dynamic object detection result satisfies an error detection condition, determining that detection of a dynamic object recognition error succeeds by using an error detector; and when the detection of the dynamic object recognition error succeeds, storing the raw data and the dynamic object detection result by using a non-volatile memory, wherein the error detection condition comprises a condition for determining whether a ratio of at least one specific dynamic object to all dynamic objects, detected from the raw data and the dynamic object detection result in M (where M is a natural number of 2 or more) number of frames, is greater than or equal to a reference ratio and a second condition for determining whether a frame ratio of frames including the at least one specific dynamic object, having a confidence score which is less than or equal to a reference confidence score in the M number of frames, is greater than or equal to 50%.

2. The method of claim 1, wherein the reference ratio is set based on a ratio of the at least one specific dynamic object to the all dynamic objects in a learning data set previously collected in various test driving environments.

3. The method of claim 1, wherein the M is 10 to 30.

4. The method of claim 1, wherein the error detection condition comprises a condition for determining whether a frame ratio of frames including the at least one specific dynamic object in the M (where M may be a natural number of 2 or more) frames is greater than or equal to a reference frame ratio (%) which is previously set.

5. The method of claim 4, wherein the reference frame ratio (%) is 20%.

6. The method of claim 4, wherein the reference frame ratio (%) is set based on a frame ratio of frames including the at least one specific dynamic object detected from a test dynamic object detection result obtained through the dynamic object recognition model in the M frames while the autonomous vehicle is actually driving in various test driving environments.

7. The method of claim 1, wherein the at least one specific dynamic object is an object which is detected in a reference distance up to the at least one specific dynamic object from the autonomous vehicle.

8. The method of claim 7, wherein the reference distance is 30 m.

9. The method of claim 1, wherein the determining that the detection of the dynamic object recognition error succeeds further comprises selecting a dynamic object, having a number of objects which is less than or equal to a reference ratio to a dynamic object where the number of objects is largest, as the at least one specific dynamic object in a learning data set previously collected in various test environments.

10. An apparatus for automatically detecting a dynamic object recognition error in an autonomous vehicle, the apparatus comprising:

a processor;

a sensor controlled by the processor to obtain sensor data by frame units;

a parser executed by the processor to parse the sensor data to generate raw data;

a dynamic object recognition model executed by the processor to analyze the raw data to output a dynamic object detection result;

an error detector executed by the processor and configured to, when the dynamic object detection result satisfies an error detection condition, determine that detection of a dynamic object recognition error succeeds; and a non-volatile memory controlled by the processor and configured to, when the detection of the dynamic object recognition error succeeds, storing the raw data and the dynamic object detection result, wherein the error detection condition comprises a condition for determining whether a ratio of at least one specific dynamic object to all dynamic objects, detected from the raw data and the dynamic object detection result in M (where M is a natural number of 2 or more) number of frames, is greater than or equal to a reference ratio and a second condition for determining whether a frame ratio of frames including the at least one specific dynamic object, having a confidence score which is less than or equal to a reference confidence score in the M number of frames, is greater than or equal to 50%.

11. The apparatus of claim 10, wherein the reference ratio is set based on a ratio of the at least one specific dynamic object to the all dynamic objects in a learning data set previously collected in various test driving environments.

12. The apparatus of claim 10, wherein the error detection condition comprises a condition for determining whether a frame ratio of frames including the at least one specific dynamic object is greater than or equal to a reference frame ratio (%) which is previously set.

13. The apparatus of claim 12, wherein the reference frame ratio (%) is set based on a frame ratio of frames including the at least one specific dynamic object detected from a test dynamic object detection result obtained through the dynamic object recognition model in the M (where M is a natural number of 2 or more) frames while the autonomous vehicle is actually driving in various test driving environments.

14. The apparatus of claim 10, wherein the at least one specific dynamic object is an object which is detected in a reference distance up to the at least one specific dynamic object from the autonomous vehicle.

* * * * *